Patented Dec. 20, 1927.

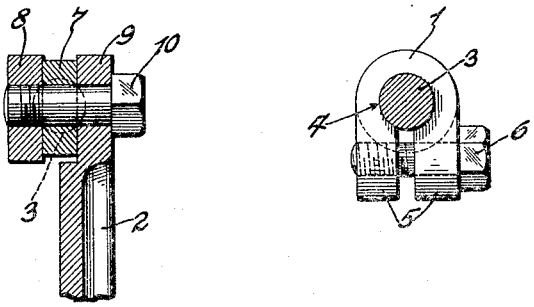

1,653,044

UNITED STATES PATENT OFFICE.

FRED B. HAMBLIN, OF ST. LOUIS, MISSOURI, ASSIGNOR TO THE WEIGHTOGRAPH COMPANY, OF ST. LOUIS, MISSOURI, A CORPORATION OF MISSOURI.

SCALE.

Application filed September 30, 1926. Serial No. 138,607.

This invention relates to improvements in scales, and consists in the novel construction hereinafter disclosed.

In the form of pendulum weighing scales shown, for example, in patent to Schaper, No. 1,402,970, dated January 10, 1922, there is a pendulum weighing mechanism in which the weight indications are projected from a chart onto a screen, the arcuate movement of the chart being responsive to the scale load.

In a scale of this construction, the chart frame is carried by an arm arranged concentric with the pivot of the pendulum. The chart moves in an arcuate path between a condensing lens and a magnifying and projecting lens, and considerable difficulty has been experienced in setting the chart and in coordinating it with the pendulum movements.

It is the purpose of the present invention to solve this problem by providing a chart frame that is adjustable in respect of the arm connected with the pendulum, together with means for locking the chart frame in its proper adjustments. Thus, an accurate adjustment of the chart to coordinate it with the arcuate movement of the arm, as well as the proper radial adjustment to fix the proper radial distance from the axis or fulcrum point of the arm, may be readily effected and maintained.

With the foregoing advantages, as well as others that will be apparent from the following detailed description, in view, I have designed the construction shown in the accompanying drawing, in which Fig. 1 is a side elevation showing the relation of the chart frame to the arm with the means for effecting the plural adjustment of the chart frame.

Fig. 2 is a sectional view on the line 2—2 of Fig. 1.

Fig. 3 is a cross section on the line 3—3 of Fig. 1.

In the embodiment of the invention illustrated in the drawing, the arm 1 corresponds to the inner portion of the arm 67 shown in the patent referred to, namely, patent to Schaper No. 1,402,970. This arm, as will be understood by reference to the Schaper patent, responds in arcuate movement to the load whereby, for predetermined increments of load, the said arm is moved predetermined distances on the pivot on which the inner end of the arm is fulcrumed.

In the present invention, the chart frame 2 is separate from the arm 1, the chart frame 2 and the arm 1 being connected together by means of a stud 3 that fits into a recess 4. The end of the stud 3 that fits into the recess 4 is preferably cylindrical so that it will have a circular as well as a longitudinal movement. The bottom wall of the recess is split and has a pair of depending lugs 5 connected therewith which form, together with a set screw 6, a clamp or clevis for holding the shank of the stud 3 in selected longitudinal and circular adjustment. The forward end of the stud 3 is flattened to form a portion 7 that is rectangular in cross section and circular in outer contour. The end of the chart frame that attaches to the flattened extension 7 of the connecting member 3 has spaced lugs 8 and 9 formed integral with the frame and between which lugs the portion 7 fits. The lugs as well as the extension 7 are arranged with registering openings approximately through the center thereof and the wall of the opening in the lug 8 is threaded to receive the end of a set screw 10.

The segmental portion of the chart frame has an arcuate opening therein, said opening being recessed at its margin to receive and hold the chart 11 that comprises an arcuate section of glass, celluloid or other transparent material upon which the scale indicia is arranged in the form of a graduated arcuate scale.

It will be understood that the projecting means for projecting the scale onto a screen is required to be accurately centered with the chart, so that the predetermined arcuate movement thereof, as determined by predetermined increments of load, will accurately reproduce and represent each scale setting. In the present invention, no particular accuracy in setting the chart in the frame is required because of the fact that the accurate adjustment of the chart frame is provided for, thus saving a considerable amount of time and labor in setting the chart in the chart frame. The rough adjustment that results from the positioning of the chart in the recess in the chart frame is sufficient. The chart is therefore assembled with the chart frame by placing the chart member in the recess and clipping it in place by a plurality of clips 12 fastened into the wall of the arcuate portion of the chart frame and extending across the face of the chart member. If desired, the chart member may be secured in position by any suitable material placed around the marginal edge thereof to secure it in the recess.

In centering the chart, the radial adjustment is effected by moving the stud 3 in the recess 4 and clamping it when the proper radial adjustment has been effected. Inasmuch as the chart frame is capable of being adjusted circumferentially in respect of the stud 3, any proper arcuate adjustment thereof may be effected to center the scale image in response to the arcuate movements of the arm 1 by the weighing mechanism.

The present construction has an immense practical advantage in connection with scale constructions of this type for the reason that the adjustment may be readily made after the scale has been set up or after it has been thrown out of adjustment for any reason in use. The simplicity of the adjustment makes it possible for unskilled persons to make the adjustment, thus saving the necessity of expert adjustments in the field, as well as requiring an expert for adjusting the scale upon the original inspection.

I am aware that the invention may be modified in numerous particulars without departing from the spirit and scope thereof, but what I claim and desire to secure by Letters Patent is:

1. In a scale, the combination of an arm having arcuate movement responsive to predetermined increments of load, an arcuate chart frame, an arcuate chart carried by said frame, and a connection between the chart frame and said arm, said connection being adjustable longitudinally and arcuately to change the longitudinal adjustment and the arcuate adjustment of said frame in respect of said arm.

2. In a scale, the combination of an arm having arcuate movement responsive to predetermined increments of load, an arcuate chart frame, an arcuate chart carried by said frame, a connection between the chart frame and said arm, said connection being adjustable longitudinally and arcuately to change the longitudinal adjustment and the arcuate adjustment of said frame in respect of said arm, and settable means for maintaining the predetermined adjustments of said frame and said arm.

3. In a scale, the combination of an arm having arcuate movement responsive to predetermined increments of load, an arcuate chart frame, an arcuate chart carried by said frame, and a connection between the chart frame and said arm comprising a recess in said arm and a stud movable in said recess, said stud having a pivot connection with the frame.

4. In a scale, the combination of an arm having arcuate movement responsive to predetermined increments of load, an arcuate chart frame, an arcuate chart carried by said frame, and a connection between the chart frame and said arm comprising a recess in said arm and a stud movable in said recess, said stud having a pivot connection with the frame, settable means for clamping said stud at predetermined adjustments of said recess, and settable means for holding the frame against pivot movement upon said stud.

5. In a scale, the combination of an arm having arcuate movement responsive to predetermined increments of load, a chart frame, a chart carried by said frame, and a connection between said chart frame and said arm whereby an arcuate adjustment of the frame in respect of said arm may be effected.

6. In a scale, the combination of an arm having arcuate movement responsive to predetermined increments of load, a chart frame, a chart carried by said frame, a connection between said chart frame and said arm whereby an arcuate adjustment of the frame in respect of said arm may be effected, and settable means for holding the chart frame in selected arcuate adjustments in respect of said arm.

FRED B. HAMBLIN.